Patented Aug. 27, 1935

2,012,496

UNITED STATES PATENT OFFICE 2,012,496

PROCESS OF PREPARING PAVING MIXTURES

Charles F. Carroll, Los Angeles, Calif., assignor to American Bitumuls Company, San Francisco, Calif., a corporation of Delaware No Drawing. Application July 14, 1931, Serial No. 550,755

9 Claims. (Cl. 106—31)

The invention relates to a method of coating aggregates with bituminous materials in the manufacture of paving mixture and the like in which discrete particles of aggregates and fillers are provided with substantially uniform and closely adherent films of bituminous binders whereby they may be laid or formed into coherent and solid masses.

The invention is particularly adapted to roadway construction and affords a method of producing a composition of paving aggregates coated with bituminous materials capable of being laid hot or cold immediately after mixing, or stored for considerable periods of time or transported for substantial distances without deterioration.

The invention contemplates the use of bituminous emulsions to supply in part the binding effect for the aggregates and to supplement the binding effect of bitumen in unemulsified form, producing therewith a composite bituminous film on the surfaces of the said aggregates of desirable characteristics as hereinafter pointed out.

An object of the invention is to provide a coated aggregate capable of being stored for substantial periods of time or transported for considerable distances without deterioration and which may be bound together to form a compact mass when desired, by merely subjecting the coated aggregate to compaction or pressure.

Another object is to present a method of applying closely adherent bituminous films to aggregates wherein bituminous emulsions are employed.

Another object is to disclose a method of coating aggregates with closely adherent bituminous films whereby the individual coated particles are rendered temporarily non-adhesive.

Another object is to devise a method of applying bituminous emulsions and molten bitumen to aggregates whereby the coated particles may be handled in cold condition and compacted when desired into dense coherent form.

Another object is to disclose various modifications of bituminous films formed by separate applications of molten bitumen and bituminous emulsion to aggregates.

Other objects and advantages of the invention will be apparent from the following description and examples.

The invention broadly comprehends the addition of bituminous emulsion and molten bitumen to aggregates in separate steps and in either sequence.

By the term bituminous emulsion is meant a dispersion of a bituminous substance with water, which may be a dispersion of a normally liquid or semi-liquid bituminous binder in water, or a dispersion of a semi-solid or solid bituminous substance in water, such as are commonly known as asphaltic emulsions, and used in customary highway construction.

The bituminous emulsion may be "quick breaking" of the type prepared by mixing molten or liquid bitumen with alkaline water in the absence of material amounts of soaps, clays or other emulsifiers, or it may be of the slow breaking type containing substantial proportions of soap, clay or the like. These emulsions or dispersions are considered of the oil-in-water type but emulsions in which the phase is reversed and the water dispersed throughout the bitumen are also embraced.

The term bitumen is intended to cover pitches, asphalts and the like generally solid at atmospheric temperatures and capable of liquefaction by heat. These materials are commonly referred to as bituminous binders, paving asphalts and bituminous or asphaltic cements.

The term aggregates is meant to embrace a variety of materials such as gravel or crushed rock, crushed brick, slag and the like, sand, pumice, burned clay, powdered limestone or other fillers, coal particles or other carbonaceous material, granular or fibrous material or various combinations of these such as are generally suitable for manufacture into unitary structures with the aid of suitable binders.

In carrying out the process, aggregates of suitable grading and character may be placed in a suitable mixer or pug mill and a quantity of bituminous emulsion added and thoroughly intermixed therewith. The emulsion is preferably of the quick breaking type comprising substantially equal proportions of asphalt and alkaline water and free from kerosene, naphtha or other volatile solvents of asphalt.

When thoroughly intermixed, generally after less than one minute of agitation, hot molten bitumen may be added and the mixing continued until the bitumen is thoroughly and uniformly incorporated in the mass.

The coated aggregate may then be removed from the mixer and transported to the desired location, spread and compacted, or it may be stored in stock piles for subsequent use. The workability of the mixture may be controlled by the character of the bitumen in the bituminous emulsion, the softer the bitumen used, the longer the mass will remain incoherent and non-adhesive before placing.

Increased workability may be attained by diluting the bituminous emulsion with water or adding water to the mass as a final step before removing the coated aggregate from the mixer.

The aggregates are preferably heated before placing in the mixer and this heating may be accomplished by the ordinary drying and heating equipment available in paving work, or the heating of the aggregate may be accomplished in whole or in part by mixing with sulphur or other combustible material which is ignited and completely consumed on the surfaces of the aggregate before the bituminous emulsion is added.

The heating and drying of the aggregate previous to its admixture with bituminous emulsion serves a valuable purpose in preventing the formation of moisture films between the aggregate and the bitumen deposited from the emulsion and thus insures a proper bonding and avoidance of any tendency toward peeling off, which might otherwise be encountered.

At any stage during the application of the composite film of bitumen as described the coating may be modified by the addition of powdered bitumen or the like to lower the penetration of the bitumen deposited and as a final step, dust or finely divided mineral matter may be added to the mix to prevent premature adherence of the individual coated particles, or solvents may be employed to soften the final coating if desired.

The invention is not limited to the application of bituminous emulsion and molten bitumen respectively, in the sequence described but equally effective results are attainable if heated aggregates are first mixed with molten bitumen and bituminous emulsion added as a second step.

The following examples of the process of the invention as applied to the manufacture of paving compositions, will serve to indicate how the process may be properly carried out.

*Example I.*—A quantity of crushed rock or gravel, sand and crusher dust proportioned as to particle sizes according to the well known practice of grading pavement aggregate mixtures and heated to a temperature between 200 and 300 degrees Fahrenheit is placed in a pug mill or mixer equipped with mechanically operated paddles carried on revolving shafts.

Bituminous emulsion consisting of asphalt emulsified in alkaline water is added to the heated aggregate in the mixer in the proportion of approximately 2 to 4 percent by weight of the aggregate depending on the grading employed and the thickness of the composite coating required, and thoroughly mixed therewith.

Asphaltic cement, consisting of the residue from the distillation of petroleum which has been previously heated to a temperature of 275 to 350 degrees Fahrenheit, is then added to the mix in proportions of approximately 3 to 6 percent by weight of the aggregate, the amount of asphaltic cement being preferably in the ratio of 3 parts to 2 parts of bituminous emulsion. Mixing is continued until the asphaltic cement is thoroughly and uniformly incorporated into the mix.

The coated aggregate is then discharged from the mixer, transported to the desired location, laid in place, raked smooth and compacted by suitable means to a hard surface, or it may be stored in stock piles for future use without premature sticking or agglomeration such as would impair its workability. When the material is to be stored for extended periods prior to use, particularly in cold weather, it may be desirable to increase the proportion of bituminous emulsion, in which event equal quantities of bituminous emulsion and asphaltic cement have been found suitable.

*Example II.*—Mineral aggregate graded according to the pavement requirements is heated by any suitable means to a temperature between 200 and 300 degrees Fahrenheit and discharged into a mixer provided with suitable paddles or stirring devices.

Asphaltic cement as previously described, heated to a temperature of 275 to 350 degrees Fahrenheit is added to the aggregate in the mixer in quantity which, together with the bituminous emulsion to be subsequently added, will provide a mix of desired bitumen content.

Bituminous emulsion consisting of a semi-fluid petroleum residuum emulsified in approximately equal amount of water is then introduced into the heated mass in quantity from two-thirds to equal amount of the asphaltic cement previously added, and thoroughly intermixed.

The coated aggregate may be used for pavement construction at any convenient time thereafter by merely spreading and leveling to a uniform surface and compacting by means of rollers or other suitable devices.

In either of the above examples the workability of the coated aggregates may be increased by additional water over that contained in the bituminous emulsion. In such event the water may be supplied by diluting the emulsion with 25 to 75 percent by weight of water, the emulsion being inherently capable of such dilution or being stabilized against breakdown due to such dilution. The additional water may also be added as a final step in the mixing process.

When bituminous emulsion is added to hot dry aggregates there is a tendency toward breakdown or separation of the constituents into free water and bitumen. The moisture is repelled from the heated surfaces of the aggregates and driven outward from the surface of the deposited bitumen film as steam or accumulated thereon or therein in the form of globules of free water. When hot asphaltic cement is subsequently added, the outward passage of moisture continues so that any free water remaining is accumulated in or on the outer surfaces of the composite film.

When hot asphalt cement is added to heated and dried aggregates there is no tendency for moisture from the subsequent addition of bituminous emulsion to interfere with the bonding effect. It has been found that while a portion of the water content of the emulsion is converted into steam and driven off by the heat employed, a substantial portion of the water of emulsification remains as a complete or partial film of free water on the surfaces of the coated particles. This moisture coating tends to counteract the stickiness of the bituminous coating on the particles and to prevent the particles from adhering and forming a mass while the material is being manipulated or is in storage prior to use. The amount of water remaining on the surfaces of the coated particles may be controlled by suitably regulating the temperature of the aggregates and that of the asphalt cement. Lower temperatures leave more water and consequently more time for manipulation or storage before the particles adhere and unite to form a mass or body.

Aside from the function of the water in rendering the coated aggregates temporarily non-adhesive as above described, the same effect to a lesser degree may be accomplished by the substitution of viscous asphalts which are slightly fluid at atmospheric temperatures, for bituminous emulsions in the process of the invention.

Thus in Example II when a coating of asphaltic cement of usual low penetration customary in pavement practice is given an outer coating of an emulsion of semi-fluid petroleum residuum, the bitumen deposited from the emulsion would provide a semi-liquid protective film which would tend to prevent adhesion between the individual coated particles until such time as the two coatings become blended or fluxed together. This feature is apart from and supplemental to the effect of the water from the emulsion and it is obvious that the semi-liquid petroleum residuum or flux could be employed in unemulsified condition and still afford a degree of temporary non-adhesion and the same blending or fluxing effect.

While specific examples of certain methods for carrying out the invention have been given, it is understood that the invention is not limited thereby, but is intended to embrace all changes and modifications as come within the scope of the following appended claims.

I claim as my invention:

1. The process of preparing paving mixtures of mineral aggregates coated with bituminous binders which comprises heating and drying the aggregates and mixing bitumen from separate sources, in the form of hot molten bitumen solid at atmospheric temperatures and in the form of aqueous bituminous dispersion, respectively, with the hot dry aggregates.

2. The process of preparing paving mixtures of mineral aggregates coated with bitumen which comprises heating the aggregates, adding a major portion of the bitumen in the form of hot molten asphalt solid at atmospheric temperatures and then adding the remainder of the bitumen in the form of an aqueous bituminous emulsion to the heated mixture.

3. The process of coating aggregates with bituminous films which comprises heating the aggregates, applying a first coating of hot, molten bitumen solid at atmospheric temperatures, and applying a second coating of aqueous bituminous emulsion to the hot, coated aggregates, whereby a composite coating is provided of predetermined characteristics dependent on the respective characteristics of the bitumen in the first and second coating, and having a protective film of moisture thereon adapted to prevent adhesion of adjacent coated particles.

4. The process of preparing paving mixtures of mineral aggregates coated with bitumen, which comprises heating the aggregates to a temperature sufficient to expel moisture therefrom, adding a portion of the bitumen to the dry heated aggregates in the form of aqueous bituminous emulsion and then adding the remainder of the bitumen in the form of hot molten bitumen.

5. The process of preparing paving mixtures of mineral aggregates coated with bitumen containing moisture adjacent the outer surfaces which comprises heating the aggregates by means of dry heat to a temperature sufficient to eliminate all moisture therefrom, admixing a portion of the bitumen in the form of an aqueous bituminous emulsion with the dry heated aggregates whereby bitumen from the said emulsion is deposited on the surfaces of said aggregates and moisture repelled therefrom, and then admixing the remainder of the bitumen in the form of hot molten bitumen.

6. The process of preparing paving mixtures suitable for cold laying of mineral aggregates coated with asphaltic binders which comprises heating the aggregates to a temperature sufficient to eliminate moisture therefrom and adding asphalt in separate steps, in the form of hot molten paving asphalt and in the form of an aqueous emulsion of semi-liquid asphalt respectively, with the hot dry aggregates.

7. The process of preparing paving mixtures suitable for laying cold of mineral aggregates coated with asphalt which comprises heating the aggregates to a temperature sufficient to expel moisture therefrom, adding a major portion of asphalt in the form of hot molten paving asphalt and then adding the remainder of the asphalt in the form of an aqueous emulsion of a substantially softer asphalt to the heated mixture.

8. The process of preparing paving mixtures of mineral aggregates coated with bitumen which comprises heating the aggregates to a temperature sufficient to expel moisture therefrom by means of dry heat, adding a minor portion of the bitumen to the dry heated aggregates in the form of aqueous bituminous emulsion, and then adding the remainder of the bitumen in the form of hot molten paving asphalt.

9. The process of preparing paving mixtures of mineral aggregates coated with bitumen containing moisture adjacent the outer surfaces which comprises heating the aggregates to a temperature sufficient to expel moisture therefrom, admixing soft bitumen in the form of an aqueous bituminous emulsion with the dry heated aggregates whereby bitumen from the said emulsion is deposited on the surfaces of said aggregates and moisture repelled therefrom and then admixing the remainder of the bitumen in the form of hot molten paving asphalt with the said aggregates.

CHARLES F. CARROLL.